US012604035B2

(12) United States Patent
Ryu et al.

(10) Patent No.: US 12,604,035 B2
(45) Date of Patent: Apr. 14, 2026

(54) METHOD AND APPARATUS FOR MULTI VIEW VIDEO ENCODING AND DECODING, AND METHOD FOR TRANSMITTING BITSTREAM GENERATED BY THE MULTI VIEW VIDEO ENCODING METHOD

(71) Applicant: RESEARCH & BUSINESS FOUNDATION SUNGKYUNKWAN UNIVERSITY, Suwon-si (KR)

(72) Inventors: Eun Seok Ryu, Seoul (KR); Jong Beom Jeong, Yangju-si (KR); Soon Bin Lee, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 111 days.

(21) Appl. No.: 18/354,983

(22) Filed: Jul. 19, 2023

(65) Prior Publication Data

US 2024/0048764 A1     Feb. 8, 2024

(30) Foreign Application Priority Data

Aug. 3, 2022     (KR) ........................ 10-2022-0096767
Jun. 16, 2023     (KR) ........................ 10-2023-0077401

(51) Int. Cl.
*H01L 29/94*          (2006.01)
*H04N 19/124*          (2014.01)
(Continued)

(52) U.S. Cl.
CPC ......... *H04N 19/597* (2014.11); *H04N 19/124* (2014.11); *H04N 19/136* (2014.11); *H04N 19/172* (2014.11)

(58) Field of Classification Search
CPC .. H04N 19/597; H04N 19/124; H04N 19/136; H04N 19/172
See application file for complete search history.

(56) References Cited

U.S. PATENT DOCUMENTS 10,841,662 B2 * 11/2020 Phillips .............. G06Q 30/0241
2003/0108099 A1 * 6/2003 Nagumo ................... G06T 9/20
                                                          375/E7.199
(Continued)

FOREIGN PATENT DOCUMENTS

EP          3547703 A1 * 10/2019   ....... H04N 21/85406

OTHER PUBLICATIONS

Jeong, Jong-Beom, Soonbin Lee, and Eun-Seok Ryu. "DWS-BEAM: Decoder-wise subpicture bitstream extracting and merging for MPEG immersive video." 2021 International Conference on Visual Communications and Image Processing (VCIP). IEEE, Dec. 5, 2021. (pp. 1-5).
(Continued)

*Primary Examiner* — Joseph Suh
(74) *Attorney, Agent, or Firm* — NSIP Law

(57)          ABSTRACT
A multi-view video encoding/decoding method and apparatus is provided, and a method for transmitting a bitstream generated by the multi-view video encoding method is provided. The multi-view video encoding method includes generating first bitstreams for each of a plurality of quantization parameters (QPs) different from each other by encoding an atlas for a multi-view video in the quantization parameters, extracting second bitstreams for sub-regions in the atlas from the first bitstreams, and generating a third bitstream by merging, among the second bitstreams, second bitstreams with a predetermined bit rate.

7 Claims, 11 Drawing Sheets

(51) Int. Cl.

| | | |
|---|---|---|
| *H04N 19/136* | (2014.01) | |
| *H04N 19/172* | (2014.01) | |
| *H04N 19/597* | (2014.01) | |

(56) References Cited

U.S. PATENT DOCUMENTS

| | | | | |
|---|---|---|---|---|
| 2005/0053294 | A1* | 3/2005 | Mukerjee | H04N 19/51 |
| | | | | 375/E7.125 |
| 2006/0126962 | A1* | 6/2006 | Sun | H04N 19/895 |
| | | | | 382/268 |
| 2021/0001193 | A1* | 1/2021 | Hayden | A63B 67/002 |
| 2021/0097724 | A1* | 4/2021 | Roimela | H04N 19/70 |
| 2021/0287405 | A1* | 9/2021 | Lim | G06V 20/64 |
| 2022/0094980 | A1* | 3/2022 | Joshi | H04N 19/167 |
| 2022/0164994 | A1* | 5/2022 | Joshi | G06T 9/001 |
| 2022/0172402 | A1* | 6/2022 | Davies | G06T 9/00 |
| 2022/0360828 | A1* | 11/2022 | Huang | H04N 21/2365 |
| 2024/0048764 | A1* | 2/2024 | Ryu | H04N 19/136 |

OTHER PUBLICATIONS

Ryu, Eun-Seok, "Syntax and Semantics of Metadata for Delta Bitrate Allocation for Immersive Video", Multidimensional Imaging Technology Standardization Forum, XDFK_01.0031/R0, Nov. 23, 2022. (pp. 1-17).

* cited by examiner

FIG. 7

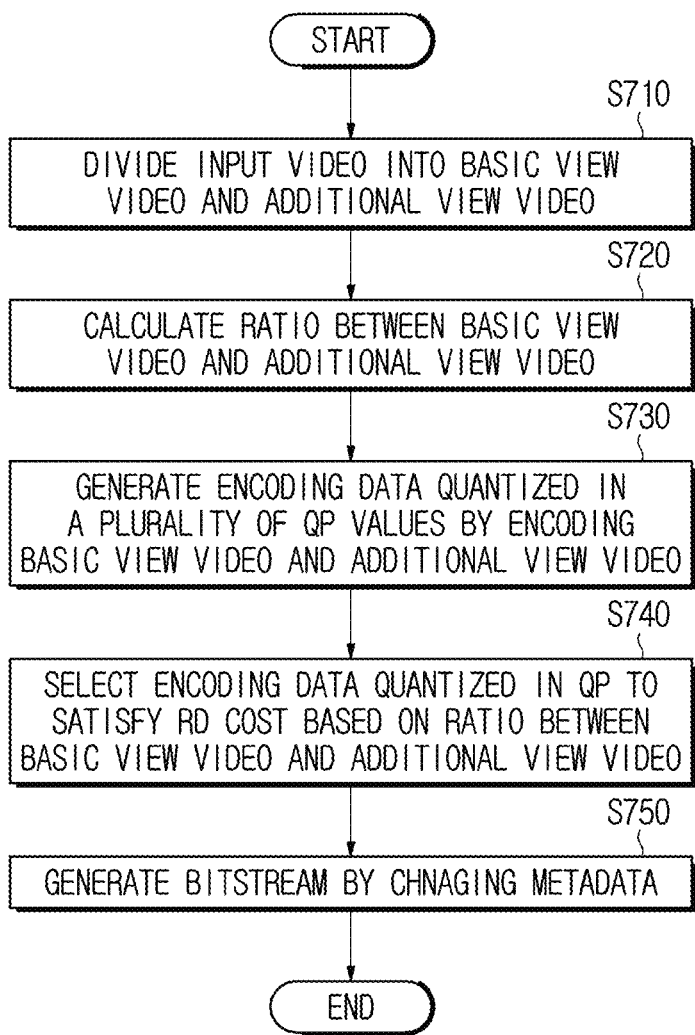

START

S710

DIVIDE INPUT VIDEO INTO BASIC VIEW
VIDEO AND ADDITIONAL VIEW VIDEO

S720

CALCULATE RATIO BETWEEN BASIC VIEW
VIDEO AND ADDITIONAL VIEW VIDEO

S730

GENERATE ENCODING DATA QUANTIZED IN
A PLURALITY OF QP VALUES BY ENCODING
BASIC VIEW VIDEO AND ADDITIONAL VIEW VIDEO

S740

SELECT ENCODING DATA QUANTIZED IN QP TO
SATISFY RD COST BASED ON RATIO BETWEEN
BASIC VIEW VIDEO AND ADDITIONAL VIEW VIDEO

S750

GENERATE BITSTREAM BY CHNAGING METADATA

END

FIG. 11
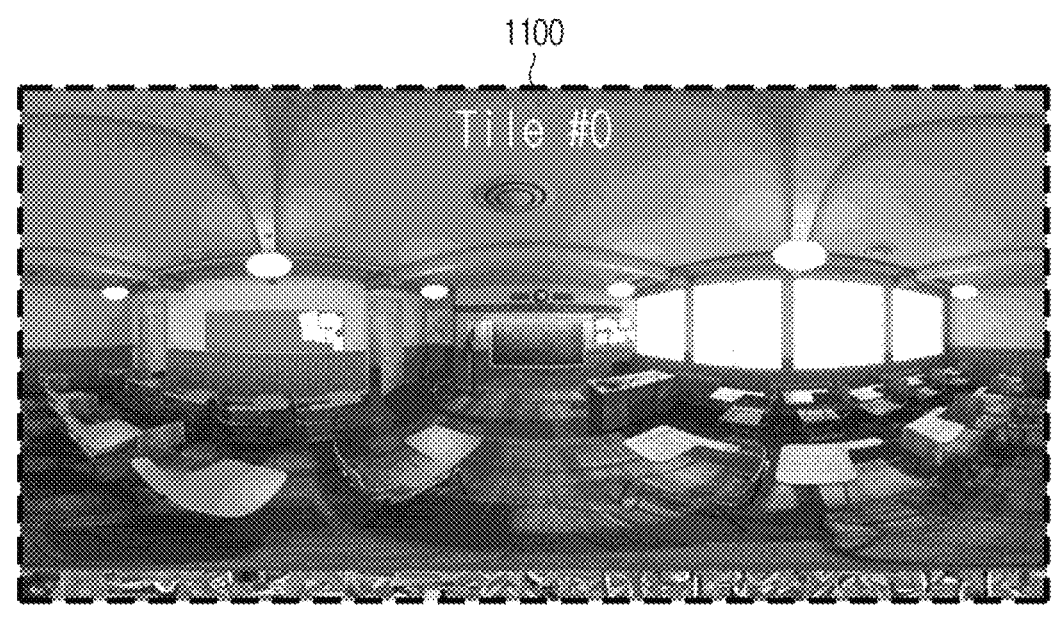
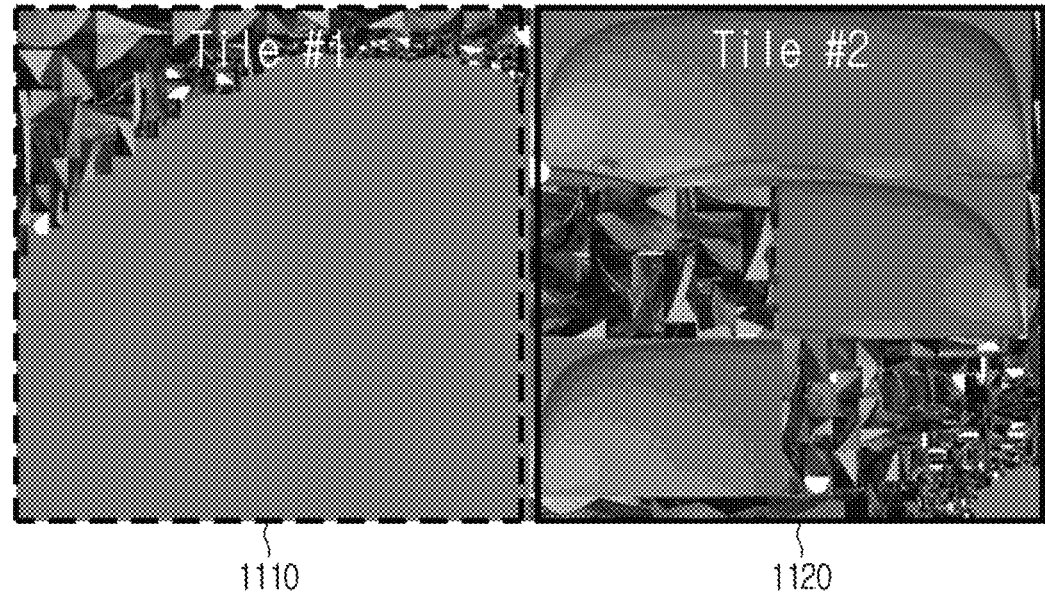

METHOD AND APPARATUS FOR MULTI VIEW VIDEO ENCODING AND DECODING, AND METHOD FOR TRANSMITTING BITSTREAM GENERATED BY THE MULTI VIEW VIDEO ENCODING METHOD

CROSS-REFERENCE TO RELATED APPLICATION

This application claims priority to and the benefit of Korean Patent Application No. 2022-0096767, filed on Aug. 3, 2022, and Korean Patent Application No. 2023-0077401, filed on Jun. 16, 2023, disclosure of which are incorporated herein by reference in its entirety.

BACKGROUND

1. Field of the Invention

The present disclosure relates to a method for encoding and decoding a multi-view video, and more particularly, to a multi-view video encoding/decoding method and apparatus applying different quantization parameters and a method for transmitting a bitstream generated by the multi-view video encoding method.

2. Description of the Related Art

The immersive video is a technology of using videos from multiple views and depth map information to provide a higher degree of freedom to users. As a plurality of videos are needed to smoothly provide such an immersive video service, a higher bandwidth is required.

Currently, the standardization group MPEG (Moving Picture Experts Group) is standardizing an immersive media technology capable of providing motion parallax according to screen conversion and movement to users by acquiring and processing videos present from various views and locations.

As a part of the standardization, the MPEG-I (Immersive) sub-group defined a test model for immersive video (TMIV) supporting immersive media providing 6 degrees of freedom (DoF) at the 126th MPEG meeting held in March, 2019.

The 6DoF immersive media technique standardization is still carrying out performance exploration for the MIV (Model for Immersive Video) technology to process a plurality of videos for an immersive video. As a 6DoF technique supports views according to a user's free gaze and movement, a high bandwidth and a large operation amount are required for a process where videos acquired from various locations are simultaneously compressed and transmitted and a video of a user's view is acquired and synthesized.

Currently, to reduce the number of video encoders/decoders required for processing a plurality of videos, MPEG-I adopts a method of encoding by dividing the plurality of videos into a basic view and an additional view.

However, as of now, efficient bandwidth adjustment is difficult in an adaptive streaming scenario since a basic view and an additional view are processed as a single video.

SUMMARY

The present disclosure is directed to providing a method for efficiently transmitting a basic view video and an additional view video while reducing the quality loss of a final output video in a limited bandwidth situation.

In addition, the present disclosure is directed to providing a method for selecting an optimal quantization step for a basic view video and an additional view video in order to reduce a transmission bandwidth.

In addition, the present disclosure is directed to providing a method for differentially allocating a bit rate for an immersive video.

In addition, the present disclosure is directed to providing a method for transmitting a bitstream generated by a multi-view video encoding method or apparatus according to the present disclosure.

In addition, the present disclosure is directed to providing a recording medium for storing a bitstream generated by the multi-view video encoding method or apparatus according to the present disclosure.

In addition, the present disclosure is directed to providing a recording medium for storing a bitstream received and decoded by a multi-view video decoding apparatus according to the present disclosure and used to reconstruct a multi-view video.

It is to be understood that technical objects to be achieved by the present disclosure are not limited to the aforementioned technical objects, and other technical objects not mentioned herein will be apparent to those of ordinary skill in the art to which the present disclosure pertains from the following description.

A multi-view video encoding method according to one aspect of the present disclosure may include: generating first bitstreams for each of a plurality of quantization parameters (QPs) different from each other by encoding an atlas for a multi-view video in the quantization parameters; extracting second bitstreams for sub-regions in the atlas from the first bitstreams; and generating a third bitstream by merging, among the second bitstreams, second bitstreams with a predetermined bit rate.

A multi-view video decoding method according to one aspect of the present disclosure may include: acquiring a third bitstream, in which an atlas for the multi-view video is encoded, and a fourth bitstream in which packing information is encoded; generating the atlas by decoding the third bitstream; and generating the multi-view video based on the atlas and the packing information.

A multi-view video encoding apparatus according to one aspect of the present disclosure may include: a memory; and at least one processor, and the at least one processor may generate first bitstreams for each of a plurality of quantization parameters (QPs) different from each other by encoding an atlas divided into at least one sub-region in the quantization parameters, extract second bitstreams for the sub-region from the first bitstreams, and generate a third bitstream by merging, among the second bitstreams, second bitstreams with a predetermined bit rate.

A method for transmitting a bitstream according to one aspect of the present disclosure is a method for transmitting a bitstream generated by a multi-view video encoding method, and the multi-view video encoding method may include: generating first bitstreams for each of a plurality of quantization parameters (QPs) different from each other by encoding an atlas divided into at least one sub-region in the quantization parameters; extracting second bitstreams for the sub-region from the first bitstreams; and generating a third bitstream by merging, among the second bitstreams, second bitstreams with a predetermined bit rate.

The features briefly summarized above for the present disclosure are only illustrative aspects of the detailed description of the present disclosure to be described below but do not limit the scope thereof.

BRIEF DESCRIPTION OF THE DRAWINGS

FIG. 7 is a flowchart illustrating a method for selecting data to which different quantization steps are applied according to a view in accordance with one embodiment of the present disclosure.

FIG. 11 is a view illustrating an example of encoding an atlas.

DETAILED DESCRIPTION

Figure 1:
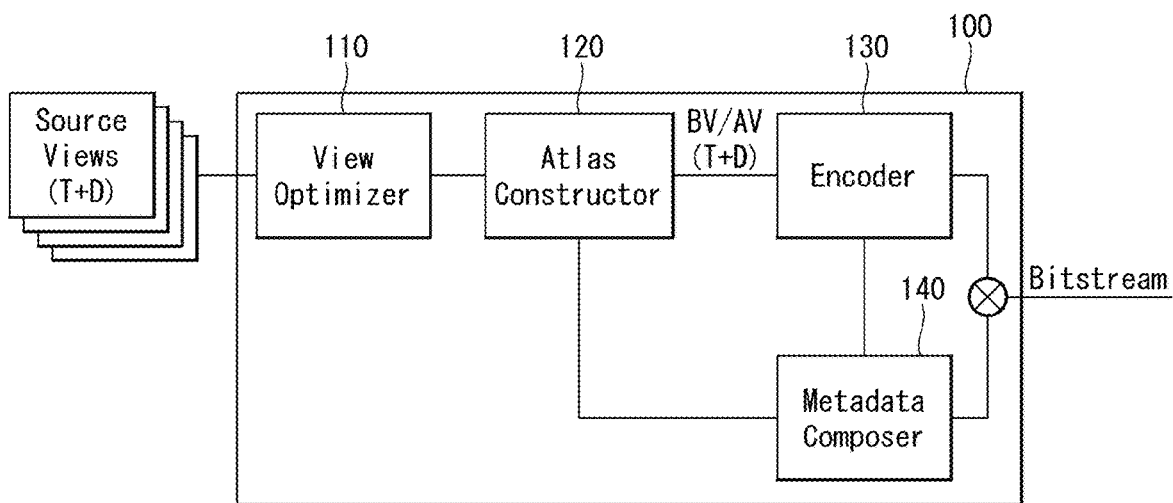
FIG. 1 is a view schematically illustrating a multi-view video encoding apparatus according to one embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the exemplary embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "connected", "coupled", or "connected" to another component, it is understood to include not only a direct connection relationship but also an indirect connection relationship having still another component intervening therebetween. Also, when a component is referred to as "comprising" another component, it may mean further inclusion of still another component not the exclusion thereof, unless explicitly described to the contrary.

In the present disclosure, the terms "first", "second", and so on are used only for the purpose of distinguishing one component from another, and do not limit the order or importance of the components unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, components described in the various embodiments do not necessarily mean essential components, but some may be optional components. Accordingly, embodiments consisting of a subset of components described in one embodiment are also included within the scope of this disclosure. In addition, embodiments including other components in addition to components described in the various embodiments are included in the scope of the present disclosure.

In the present disclosure, the term "/" and "," may be interpreted as "and/or." For instance, "A/B" and "A, B" may mean "A and/or B." In addition, "A/B/C" and "A, B, C" may mean "at least one of A, B, and/or C."

In the present disclosure, the term "or" may be interpreted as "and/or." For instance, "A or B" may comprise 1) only "A", 2) only "B", and/or 3) both "A and B". Alternatively, in the present disclosure, the term "or" may be interpreted as "additionally or alternatively."

In the present disclosure, the terms "image", "video", "multi-view video", and "immersive video" may be interchangeably used.

Hereinafter, the embodiments of the present disclosure will be described in detail with reference to the accompanying drawings. In describing the embodiments of the present disclosure, if it is determined that the detailed description of a related known function or construction renders the scope of the present disclosure unnecessarily ambiguous, the detailed description thereof will be omitted, and in the drawings, the same reference numerals are used for the same components, and a redundant description about the same component are omitted.

Recently, MPEG-I, which is a sub-group of the international standardization organization MPEG, is working on standardization of a 6DoF technique of processing videos with multiple views (multi-view videos) to respond to views according to a user's location and screen conversion beyond providing a 360-degree video to the user under the name "Immersive Video".

In order to implement 6DoF video streaming beyond a simple 360 VR video, a video responding to a viewer's every location and viewing angle by means of videos obtained from various views and a depth video (or depth map) should be provided. To respond to a viewer's viewpoint, a virtual view synthesis process for synthesizing and processing videos of various views is performed.

Currently, in an MIV, a plurality of videos together with a depth map are acquired based on a depth image-based rendering (DIBR) technique, and then a virtual video view is synthesized by calculating the view and distance of each video based on the depth map. Thus, a view may be synthesized according to a user's gaze and location, and the user may appreciate more interactive and immersive media, accordingly. To this end, MPEG-I has adopted a method of dividing a plurality of videos into a basic view and an additional view.

Figure 2:
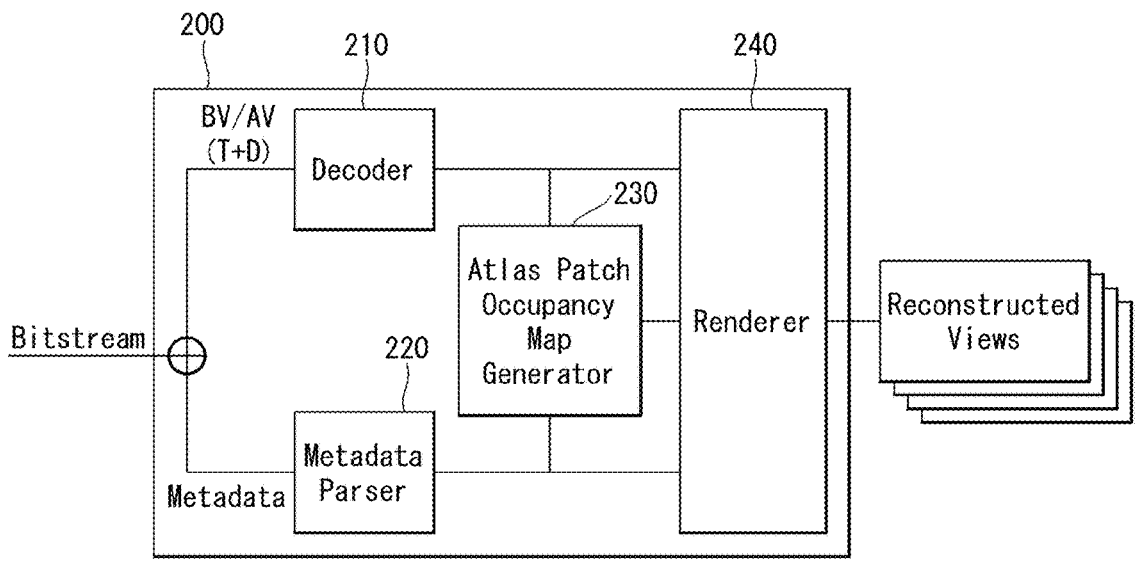
FIG. 2 is a view schematically illustrating a multi-view video decoding apparatus according to one embodiment of the present disclosure.

FIG. 1 is a view schematically illustrating a multi-view video encoding apparatus (multi-view video encoder) 100 according to one embodiment of the present disclosure, and FIG. 2 is a view schematically illustrating a multi-view video decoding apparatus (multi-view video decoder) 200 according to one embodiment of the present disclosure.

Referring to FIG. 1, the multi-view video encoding apparatus 100 may be configured including a view optimizer 110, an atlas constructor 120, an encoder 130, and a metadata composer 140.

The view optimizer 110 may receive a source video and a depth video (Source Views (T+D)) at various views as an input, determine the number of necessary basic views by considering a directional deviation, a field of view, a distance, and an overlap between fields of view, and select a basic view by considering a location and an overlap between views.

The atlas constructor 120 may construct the basic view selected by the view optimizer 110 as a complete single atlas and an additional view as a remaining patch (or residual patch) with an overlapping portion being removed based on the basic view.

The atlas constructor 120 may preserve basic views using a mask and remove an overlapping portion of additional views while generating an atlas, update a mask used for a video frame in a chronological order, and finally generate an atlas of an additional view by packing each of patch atlases.

Figure 3:
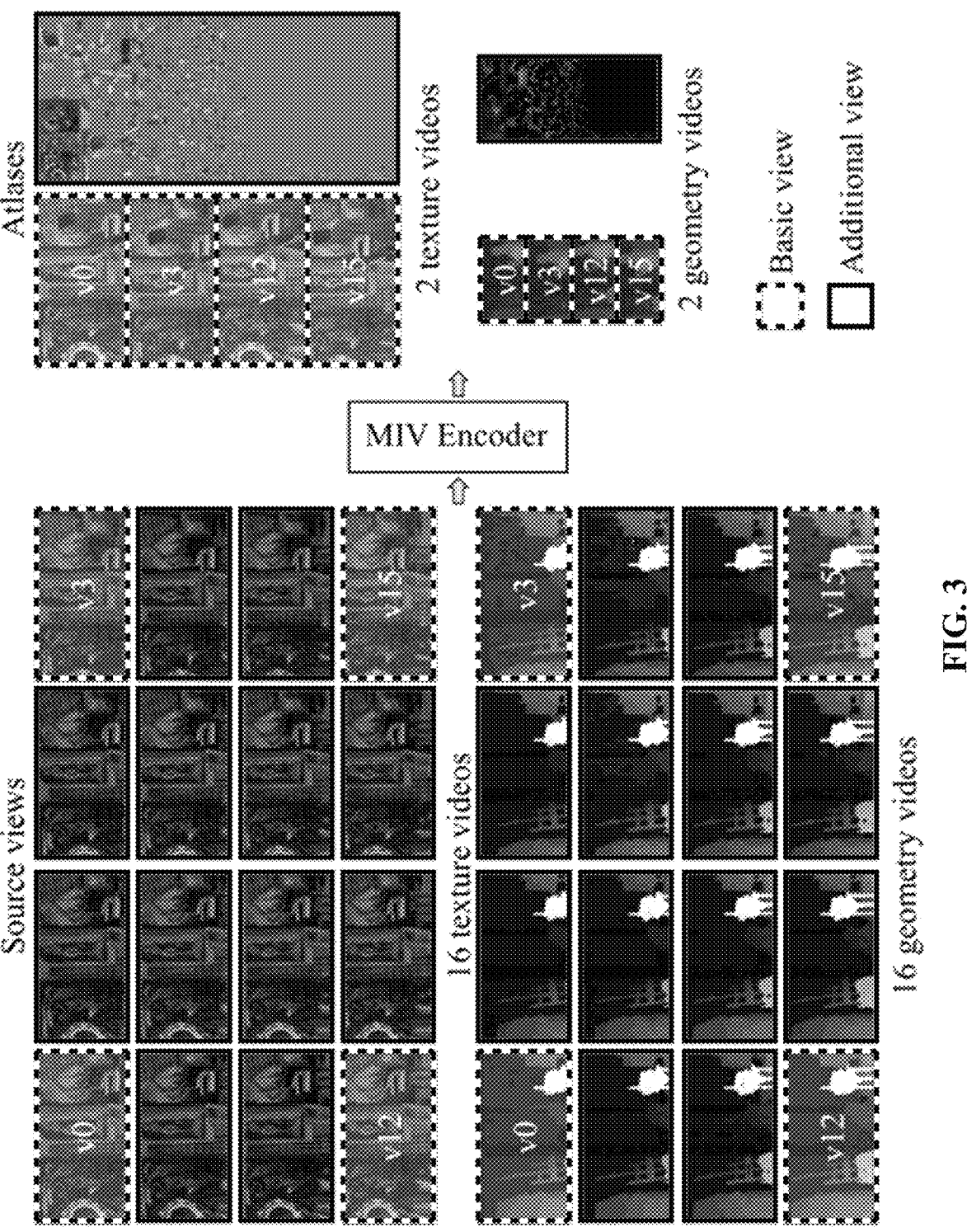
FIG. 3 is a view illustrating an example in which an MPEG immersive video technique processes a multi-view video by dividing the multi-view video into a basic view video and an additional view video.

As illustrated in FIG. 3, basic view videos (or atlases) BV represented by dotted-line boxes are constructed to be identical with originals by including texture (including depth information) and every pixel, but additional view videos (or atlases) AV represented by solid-line boxes may be constructed in a shape of a block patch including only non-overlapping texture (including depth information) that remains after overlapping pixels between the basic views and a higher-priority additional view are removed. The multi-view video decoding apparatus 200 may restore a video frame of an additional view by reconstructing the block patch.

In FIG. 3, there are source videos and depth videos of 16 views, among which videos of 4 views are selected as basic views and combined into one atlas to be generated as one basic view video (including texture and depth videos, respectively), and videos of the remaining 12 views are determined as additional videos so that only a portion different from a basic view is generated as one additional view video (including texture and depth videos, respectively) in a patch shape.

Using a 2D codec, for example, the High Efficiency Video Coding (HEVC) and the Versatile Video Coding (VVC), the encoder 130 may generate a bitstream by encoding a texture video T and a depth video D of each of a basic view BV and an additional view AV.

The metadata composer 140 may generate metadata by encoding configuration information of BV and AV atlases and/or control information for controlling a synthesis process of the BV and AV atlases so that the multi-view video decoding apparatus 200 may dynamically render a seamless viewport video according to a viewer's movement through postprocessing and view synthesis.

Referring to FIG. 2, the multi-view video decoding apparatus 200 may be configured including a decoder 210, a metadata parser 220, an atlas patch occupancy map generator 230, and a renderer 240.

The decoder 210 may generate a basic view atlas and an additional view atlas by decoding encoded texture data and depth data of a basic view and an additional view using HEVC or VVC.

The metadata parser 220 may analyze and provide metadata to the atlas patch occupancy map generator 230 and the renderer 240.

The atlas patch occupancy map generator 240 may generate a patch occupancy map by determining a location and a direction, in which a patch of an additional view atlas is to be placed, by using metadata provided by the metadata parser 220, and provide the patch occupancy map to the renderer 240.

The renderer 240 may generate and output a video responding to the viewer's movement from a basic view atlas and an additional view atlas by using the metadata provided by the metadata parser 220 and the patch occupancy map provided by the atlas patch occupancy map generator 240.

Meanwhile, additional view videos are videos segmented from each other and contain many high frequencies and thus high bit rates, but an occupancy ratio in a whole video is different according to contents. In addition, the impact of a basic view video and an additional view video on the quality of a synthesized video synthesized by the multi-view video decoding apparatus 200 may be different according to a ratio of the additional view video to a video restored or synthesized by the multi-view video decoding apparatus 200.

Figure 4:
FIG. 4 and FIG. 5 are views illustrating a difference in the amount of information between a basic view video and an additional view video.
Figure 5:
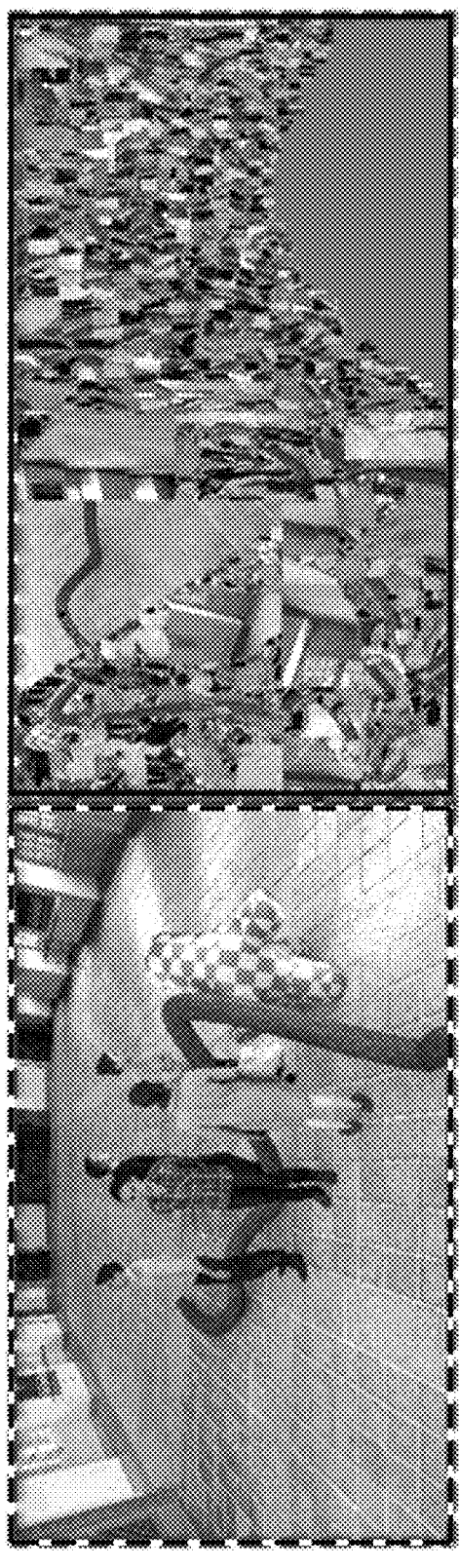

FIG. 4 illustrates an example in which an additional view video has a small amount of information since there is a large overlap between a basic view video and the addition view video, and FIG. 5 illustrates an example in which an additional view video has a large amount of information since there is a small overlap between a basic view video and the additional view video. In FIG. 4 and FIG. 5, a basic view video is at the bottom, and an additional view video is at the top.

In FIG. 4, since there are many overlapping pixels between a basic view video and an additional view video, the additional view video has a little information, and in FIG. 5, on the other hand, since there are not many overlapping pixels between a basic view video and an additional view video, the additional view video has a lot of information.

In the case of FIG. 4, since there is a little amount of information in an additional view video, the additional view video has a little impact on the quality of a synthesized video synthesized by the multi-view video decoding apparatus 200. On the other hand, in the case of FIG. 5, since there is a relatively large amount of information in an additional view video, the additional view video may have a large impact on the quality of a synthesized video.

Unlike a conventional 360-degree video, an immersive video has a process of synthesizing videos, and videos with low importance have a little impact on a finally synthesized video even when the quality of the videos is lowered, so that the finally synthesized video may have reduced loss.

When the multi-view video decoding apparatus 200 synthesize videos, since the impact of basic view and additional view videos on a whole synthesized video becomes different according to contents and/or amounts of information of a basic view and an additional view, texture encoding by considering the basic view video and the additional view video as a single video is not efficient.

In this regard, while texture encoding is performed by considering videos separately according to views, that is, whether a video is a basic view video or an additional view video, an overall bit rate may be adjusted in the multi-view video decoding apparatus 200 by adaptively varying the quality of a video according to an importance of each view so that an overall synthesized video may have high quality.

The importance of each view may be calculated by 'a ratio of the number of pixels of an additional view video to the pixels of a basic view video' or 'an occupancy ratio of the pixels of a basic view video and the pixels of an additional view video in a reconstructed video', and considering this, encoding qualities of the basic view video and the additional view video may be adjusted to be different from each other.

In one embodiment of the present disclosure, the encoding qualities of a basic view video and an additional view video may be differently adjusted by asymmetrically quantizing the basic view video and the additional view video. Herein, a quantizing step may be controlled by considering a ratio of the number of pixels of the additional view video to the number of pixels of the basic view video, and the quantizing step may be controlled within a range satisfying a target rate distortion cost (RD-cost) condition.

Figure 6:
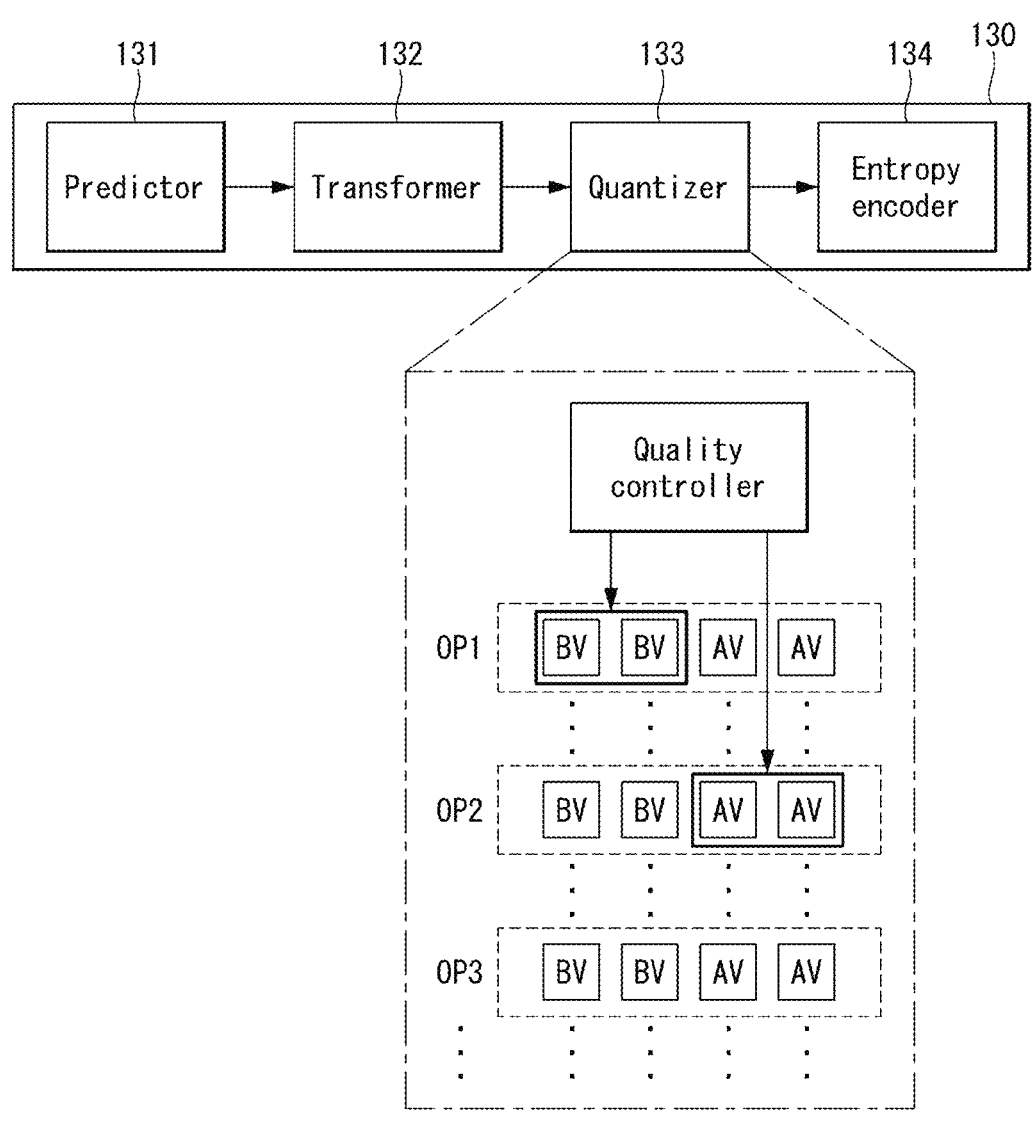
FIG. 6 is a view schematically illustrating an encoder according to one embodiment of the present disclosure.

FIG. 6 is a view schematically illustrating a configuration of an encoder 130 according to one embodiment of the present disclosure.

The encoder 130 generates a bitstream by applying HEVC or VVC not only to a basic view video (or atlas) and an additional view video (or atlas) but also to a depth video (or map) of a basic/additional view, and the encoder 130 may process the basic and additional view videos by distinguishing the videos as separate videos.

The encoder 130 may be configured including a predictor 131, a transformer 132, a quantizer 133, and an entropy encoder 134.

The predictor 131 may generate a prediction sample (or prediction block) for a coding unit (hereinafter simply referred to as block) which is partitioned by a video partitioning unit (not shown) into a plurality of coding units based on a quad-tree structure and/or a binary tree structure and generate a residual sample (or residual block) corresponding to a difference between an original sample and the prediction sample.

The predictor 131 may apply techniques used in HEVC or VVC, for example, an intra prediction technique referring to neighbor samples of a current block in a current picture, an inter prediction technique referring to a sample of another picture different from a current picture, and an intra block copy (IBC) technique referring to a sample of another block in a current picture.

The transformer 132 may generate transform coefficients by applying a transform technique to a residual sample. The transform technique may include at least one of a discrete cosine transform (DCT), a discrete sine transform (DST), a Karhunen-Loeve transform (KLT), a graph-based transform (GBT), or a conditionally non-linear transform (CNT).

The quantizer 133 may quantize transform coefficients. The quantizer 133 may rearrange block-shaped quantized transform coefficients into a one-dimensional vector shape based on a coefficient scan order and generate information on the quantized transform coefficients based on the quantized transform coefficients in the one-dimensional vector shape.

The entropy encoder 134 may encode information on quantized transform coefficients and output the information in a bitstream. For example, the entropy encoder 134 may apply various encoding methods such as the exponential Golomb, the context-adaptive variable length coding (CAVLC), the context-adaptive binary arithmetic coding (CABAC), and the like and encode information (for example, values of syntax elements) necessary for video/image reconstruction separately or together except the quantized transform coefficients.

A bitstream may be transmitted via a network or stored in a digital storage medium. Herein, the network may include a broadcast network and/or a communication network, and the digital storage medium may include various storage media such as a USB, an SD, a CD, a DVD, a Blueray, a HDD, an SSD, and the like.

The quantizer 133 according to one embodiment of the present disclosure may include a quality controller, quantize samples (residual samples) of a basic view video and an additional view video into a plurality of quantization steps (or quantization parameters) and store the samples (QP1, QP2, QP3, and the like in FIG. 6), and select a basic view video and an additional view video, to each of which a different quantization step is applied, based on a pixel number ratio between the basic view video and the additional view video (or a ratio between the pixel number of a synthesized video synthesized in the decoder and the pixel number of the additional view video).

In FIG. 6, the quality controller of the quantizer 133 selects data quantized into QP1 for a basic view video BV and data quantized into QP2 for an additional view video AV.

In addition, the quality controller of the quantizer 133 may change quantization steps for the basic view video BV and the additional view video AV in a frame unit. For example, the quality controller of the quantizer 133 may select, in a first frame, data quantized into QP1 for the basic view video BV and select data quantized into QP2 for the additional view video AV and select, in a second frame, data quantized into QP1 for the basic view video BV and select data quantized into QP3 for the additional view video AV.

In addition, the quality controller of the quantizer 133 may distinguish the pixel number ratio between a basic view video and an additional view video into a plurality of ranges and determine and apply a quantization step suitable for each of the basic view video and the additional view video for each range.

For example, the quality controller of the quantizer 133 may determine the quantization steps of Q1 and Q2 for the basic view video and the additional view video when the pixel number ratio is 1:0.5, determine the quantization steps of Q1 and Q3 (which is a quantization step with lower quality than QP2) for the basic view video and the additional view video when the pixel number ratio is 1:0.25, and determine the quantization steps of Q1 and Q4 (which is a quantization step with lower quality than QP3) for the basic view video and the additional view video when the pixel number ratio is 1:0.125.

Alternatively, the quality controller of the quantizer 133 may distinguish the pixel number ratio between a basic view video and an additional view video into a plurality of ranges and provide and apply a difference value between quantization steps suitable for the basic view video and the additional view video for each range. The quality controller of the quantizer 133 may determine the quantization steps of Q1 and Q2 for the basic view video and the additional view video when the pixel number ratio is 1:0.5, wherein QP2 corresponds to quality lower than QP1 by one step, determine the quantization steps of Q1 and Q3, which is quality one step lower than QP2 when the pixel number ratio is 1:0.25, and determine the quantization steps of Q1 and Q4, which is quality one step lower than QP3 when the pixel number ratio is 1:0.125.

In the above example, the quantization step of the basic view video is fixed to QP1, and the quantization step of the additional view video is changed, but according to constraints such as RD-cost, a network bandwidth, a required whole bit rate, and the like, the quantization step of the basic view video may be changed, and the quantization step of the additional view video may also be further changed according to the changed quantization step of the basic view video.

In the above, the values of the pixel number ratios between the basic view video and the additional view video and the values of quantization steps for the basic view video and the additional view video or the difference values thereof are only illustrative, and embodiments of the present disclosure are not limited those values.

A pixel number ratio between a basic view video and an additional view video may be delivered to the atlas constructor 120 in the multi-view video encoder 100 of FIG. 1. The atlas constructor 120 may calculate a pixel number ratio between a basic view video and an additional view video based on a group of picture (GOP) and deliver the pixel number ratio to the encoder 130.

The quantizer 133 may deliver information associated with quantization steps applied to a basic view video and an additional view video to the metadata composer 140, and the metadata composer 140 may include information associated with an asymmetric quantization step in metadata.

Alternatively, instead of being delivered to the metadata composer 140, the information associated with quantization steps may be recorded as, for example, a syntax element and encoded together in a quantized transform coefficient of a corresponding view video by the entropy encoder 134.

The multi-view video decoding apparatus 200 may extract the information associated with quantization steps from a syntax element, which is entropy encoded in metadata and/or texture data, and dequantize a quantized coefficient of the basic view video and a quantized coefficient of the additional view video based on the extracted information associated with quantization steps.

In addition, the multi-view video decoding apparatus 200 may reconstruct residual samples of a current block for a basic view and an additional view by inversely transforming a dequantized coefficient, generate a reconstructed sample of the current block based on the residual samples and prediction samples predicted for the current block, and then generate a basic view video and an additional view video (patch video of the additional view).

Next, the multi-view video decoding apparatus 200 may generate a video responding to view corresponding to a viewer's movement by combining the basic view video and the patch video of the additional view based on a patch occupancy map generated based on metadata.

FIG. 7 is a flowchart illustrating a method for selecting data to which different quantization steps are applied according to a view in accordance with one embodiment of the present disclosure.

The atlas constructor 120 generates an atlas for a basic view, which is selected by the view optimizer 110 for input videos of multiple views, and an atlas for an additional view (S710). The atlas constructor 120 may determine a pixel number of a basic view video by considering a target video pixel number (a pixel number of a synthesized video shown on a display in consideration of an environment of a terminal at a decoder side), generate an additional view video by removing an overlap with the basic view video, and determine a pixel number of the additional view video by considering a target video pixel number.

For example, in a 16-view video with a resolution of 2048×2048, a basic view video may be constructed with 4 views, and a remaining additional view video may be generated with a middle resolution, or the basic view video may be constructed with 8 views, and the remaining additional view video may be generated with a low resolution. A basic view video constructed with 4 views has a smaller number of pixels than a basic view video constructed with 8 views and thus may be processed with low complexity in a terminal, but reconstruction accuracy (quality) is lowered.

Accordingly, the atlas constructor 120 may determine a resolution of the basic view video according to a hardware configuration of a target decoder terminal or a request of the decoder terminal and generate an atlas video by distinguishing a predetermined number of corresponding input videos into a basic view and an additional view.

The atlas constructor 120 calculates a ratio between a basic view video and an additional view video, that is, a ratio between a pixel number of the basic view video and a pixel number of the additional view video per frame (S720). For example, when the pixel number of the basic view video per frame is 2,073,600 and the pixel number of the additional view video is 298,741, a ratio between a pixel number of a synthesized (or reconstructed) video and the pixel number of the basic view video may be calculated by 298,741/(2,073,600+298,741).

The atlas constructor 120 may calculate a ratio between the basic view video and the additional view video in a unit of GOP and calculate a ratio between a pixel number of the basic view video and a pixel number of the additional view video per frame accordingly.

The encoder 130 may generate a bitstream by encoding texture of the basic view video and the additional view video according to HEVC, VVC, or any other video coding techniques, and the quantizer 133 may generate quantization coefficient data by quantizing transformed coefficients of the basic view video and the additional view video in a plurality of quantization steps (QPs) (S730).

A quality controller of the quantizer 133 may select quantization coefficient data for the basic view video and quantization coefficient data for the additional view video, respectively, from the quantized data quantized in the plurality of quantization steps, construct quantization coefficient data of a single timing (constructing a frame of the timing), and select quantization coefficient data of the additional view video to which a quantization step different from a quantization step applied to the quantization coefficient data selected for the basic view video is applied based on the pixel number ratio between the basic view video and the additional view video (S740). Herein, the quantization coefficient data of the basic and additional view videos should satisfy a target RD-cost condition.

The quality controller of the quantizer 133 may asymmetrically quantization steps for the basic view video and the additional view video according to a pixel number ratio and check whether or not quantization transform data quantized by the selected quantization step satisfies the RD-cost condition. In addition, when the RD-cost condition is not satisfied, the quality controller of the quantizer 133 may select quantization steps for the basic view video and the additional view video until the RD-cost condition is satisfied. Whether or not the RD-cost condition is satisfied may be determined in a frame unit.

When a set RD-cost condition is not satisfied by any values selected for quantization steps for the basic view video and the additional view video, a target value of the pixel number of the basic view video may be adjusted to perform the process of generating the basic view video and the additional view video starting from step S710 again.

The quantizer 133 may deliver information associated with quantization steps applied to a basic view video and an additional view video to the metadata composer 140, and the metadata composer 140 may modify metadata by reflecting information associated with a quantization step in the metadata. The multi-view video encoding apparatus 100 may generate and output data generated by the encoder 130 and the metadata composer 140 in a bitstream with a multi-view video format (S750).

The bitstream generated by the multi-view video encoding apparatus 100 may be transmitted to a client device including the multi-view decoding apparatus 200 or stored in a digital storage medium.

Figure 8:
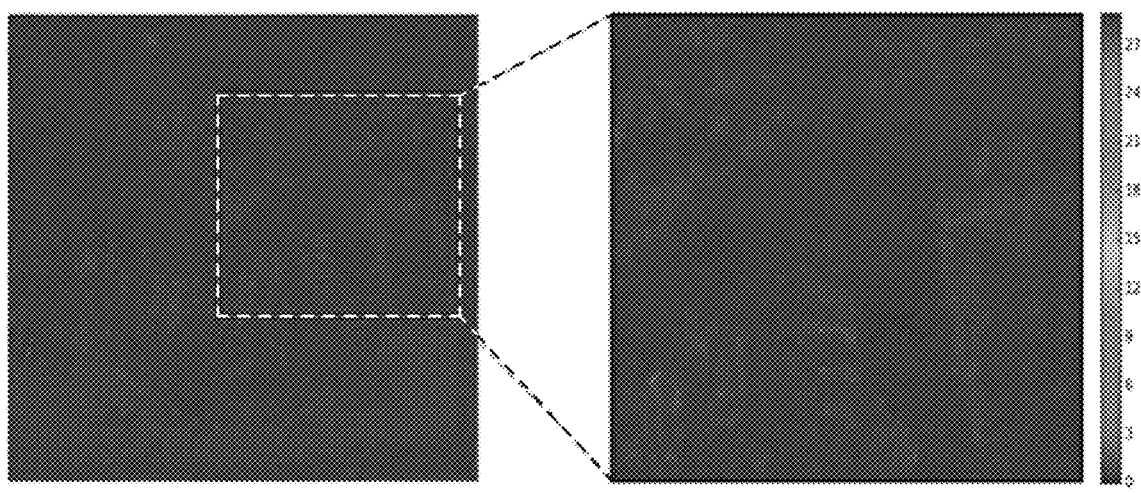
FIG. 8 is a view illustrating a difference of a synthesized video when both a basic view video and an additional view video are compressed by a quantization parameter.
Figure 9:
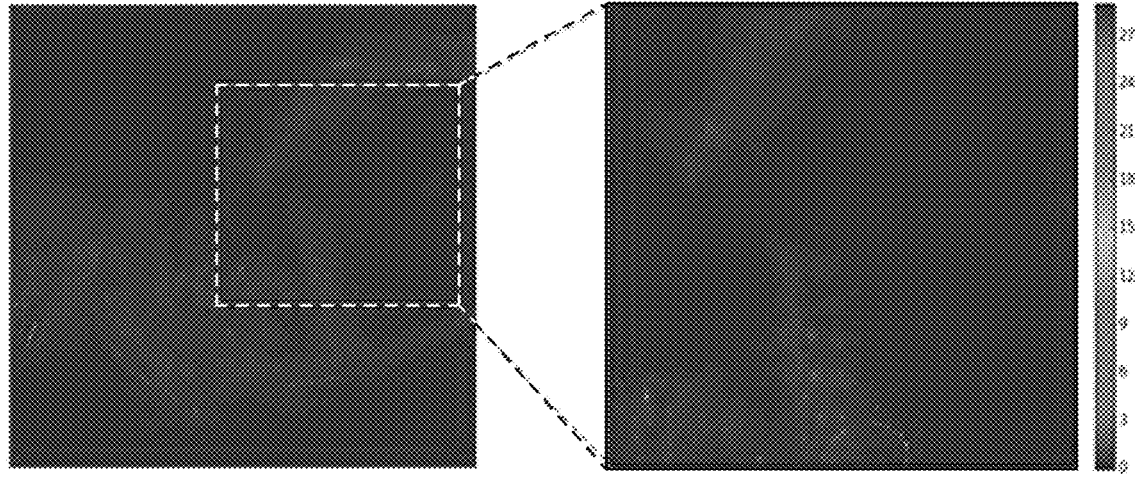
FIG. 9 is a view illustrating a difference of a synthesized video when a basic view video and an additional view video are compressed by different quantization parameters.

FIG. 8 is a view illustrating a difference of a synthesized video when both a basic view video and an additional view video are compressed by a quantization parameter, and FIG. 9 is a view illustrating a difference of a synthesized video when a basic view video and an additional view video are compressed by different quantization parameters.

In order to verify the efficiency of a method proposed in one embodiment of the present disclosure, a simulation was performed by selecting three common test conditions videos defined in MPEG-I. The HEVC test model (HM) version 16.20 was used for video encoding, and a video with one or more patches was defined as an additional view.

Quantization parameters applied to transform data of basic and additional view videos were composed of QP1 to QP5, and encoding was performed by increasing a value of a quantization parameter for an additional view by one step (that is, by using a quantization parameter with lower quality) as compared to a basic view.

Unlike FIG. 8, FIG. 9 may show that loss occurs only to a portion affected by synthesis, and this suggests that quality loss in compression may occur in a different way from existing videos according to an amount of information of an additional view video.

After a basic view and an additional view were encoded according to common test conditions and decoded again, a quality assessment was calculated for an average when original videos of each of the basic view and the additional view were reconstructed. As a result, when quantization parameters were asymmetrically applied between the basic view videos and the additional view videos to perform compression, bit rate gains of −10% to 30% could be obtained as compared to the existing compression.

That is, unlike a conventional 360-degree video, an immersive video has a video synthesis process, and videos with low importance may have a relatively small loss in a finally synthesized video even when the quality of those videos is lowered, and bandwidth transmission efficiency as compared to quality is actually improved when additional view videos with low importance were transmitted after the quality thereof was lowered.

An asymmetrical quantization allocation technique and a transmission technique, which are proposed through the present disclosure, may be used for 6DoF immersive video streaming. Immersive video streaming has a disadvantage in that a very large bandwidth is required as a plurality of videos are required for synthesizing virtual views which will respond to a user's view.

Through the technique according to an embodiment of the present disclosure, the loss of video quality may be minimized as each video is adaptively appreciated according to its importance, and a bit rate transmitted herein may also be effectively reduced.

An embodiment of the present disclosure is applicable to streaming services splitting and transmitting bit streams such as MPEG DASH, Smooth Streaming of Microsoft, HTTP Live Streaming (HLS) of Apple, and the like.

Various embodiments for a multi-view video processing method and apparatus of the present disclosure may be described briefly and clearly as follows.

A multi-view video encoding method according to one embodiment may include: dividing a plurality of view videos into a basic view video and an additional view video; calculating a ratio of the additional view video to the basic view video; obtaining transform coefficients by performing a prediction operation and a transform operation for the basic view video and the additional view video and obtaining quantization transform coefficients by quantizing each of the transform coefficients for the basic view video and the additional view video into a plurality of quantization steps; selecting, from the quantization transform coefficients quantized into the plurality of quantization steps, quantization transform coefficients quantized into a first quantization step and a second quantization step, respectively, for the basic view video and the additional view video based on the ratio; and entropy-coding the selected quantization transform coefficients.

In one embodiment, the ratio may be calculated as a ratio at which the additional view video occupies a synthesized video that the multi-view video decoding apparatus 200 synthesizes using the basic view video and the additional view video.

In one embodiment, the ratio may be a ratio between a pixel number of a synthesized video and a pixel number of the additional view video.

In one embodiment, the selecting may include selecting quantization transform coefficients quantized into the first quantization step and the second quantization step to satisfy a target rate distortion cost (RD-cost).

In one embodiment, whether or not the RD-cost is satisfied may be determined in a frame unit.

In one embodiment, when there is no quantization transform coefficient quantized into a quantization step to satisfy the RD-cost among the quantization transform coefficients quantized into the plurality of quantization steps in the selecting, modifying the pixel number of the basic view video, applying the modified pixel number, dividing the plurality of view videos into the basic view video and the additional view video again, obtaining quantization transform coefficients, and selecting a quantization transform coefficient may be performed again.

In one embodiment, the calculating may include calculating the ratio in a group of picture (GOP) unit.

In one embodiment, the selecting may include dividing the ratio into a plurality of ranges and determining a quantization transform coefficient by applying a determined quantization step to each of the basic view video and the additional view video for each range.

In one embodiment, when ratios are a first value and a second value smaller than the first value, respectively, and second quantization steps applied for generating quantization transform coefficients selected based on the first value and the second value for the additional view video are a step 2-1 and a step 2-2, respectively, the step 2-2 may be a quantization step with lower quality than the step 2-1.

In one embodiment, the dividing may include generating a basic view atlas by selecting one or more basic view videos from the plurality of view videos and generating an additional view atlas by removing an overlap with the one or more basic view videos from the remaining view videos not selected as the one or more basic from the plurality of view videos and using remaining patch videos.

In one embodiment, the multi-view video encoding method may further include reflecting information associated with a quantization step applied for generating a selected quantization transform coefficient in metadata including configuration information of the basic view video and the additional view video and/or control information for generating a synthesized video from the basic view video and the additional view video.

The multi-view video encoding apparatus 100 according to another embodiment may include: an atlas generator for generating a basic view atlas including a basic view video selected as a basic view from views of a plurality of views and a basic view atlas including a patch video, which is generated by removing an overlapping portion with the basic view video from an additional view video of a non-selected remaining view and for calculating a ratio between the basic view video and the patch video; an encoder for encoding the basic view video in the basic view atlas and the patch video in the additional view atlas by using a two-dimensional codec; and a metadata composer for encoding and outputting configuration information of the basic view atlas and the additional view atlas and/or control information for controlling a synthesizing process of the basic view atlas and the additional view atlas as metadata, and the encoder may obtain transform coefficients by performing a prediction operation and a transform operation for the basic view video and the patch video, obtain quantization transform coefficients by quantizing each of the transform coefficients of the basic view video and the patch video into a plurality of quantization steps, select quantization transform coefficients quantized into a first quantization step and a second quantization step, respectively, for the basic view video and the patch video from the quantization transform coefficients quantized into the plurality of quantization steps based on a ratio, and entropy-code the quantization transform coefficients.

In one embodiment, the ratio may be calculated as a ratio at which the additional view atlas occupies a synthesized video that a decoder synthesizes using the basic view atlas and the additional view atlas.

In one embodiment, the ratio may be a ratio between a pixel number of a synthesized video and a pixel number of the additional view atlas.

In one embodiment, the encoder may select quantization transform coefficients quantized into the first quantization step and the second quantization step to satisfy a target rate distortion cost (RD-cost).

In one embodiment, the encoder may perform an operation for determining whether or not the RD-cost is satisfied in a frame unit.

In one embodiment, the atlas generator may calculate the ratio in a group of picture (GOP) unit.

In one embodiment, the encoder may divide the ratio into a plurality of ranges and determine a quantization transform coefficient by applying a determined quantization step to each of the basic view video and the patch video for each range.

In one embodiment, when ratios are a first value and a second value smaller than the first value, respectively, and second quantization steps applied for generating quantization transform coefficients selected based on the first value and the second value for the additional view video are a step 2-1 and a step 2-2, respectively, the step 2-2 may be a quantization step with lower quality than the step 2-1.

In one embodiment, the metadata composer may reflect information associated with a quantization step applied for generating a selected quantization transform coefficient in metadata.

A multi-view video decoding apparatus according to still another embodiment may include: a texture decoder for generating a basic view atlas and an additional view atlas by decoding encoded texture data of a basic view and an additional view using a two-dimensional codec; a metadata parser for analyzing metadata including configuration information of the basic view atlas and the additional view atlas and/or control information for controlling a synthesis process of the basic view atlas and the additional view atlas; an atlas patch occupancy map generator for generating a patch occupancy map by determining a location and a direction, in which a patch video in the additional view atlas is to be placed, by using the metadata; and a renderer for generating a video responding to a viewer's movement from the basic view atlas and the additional view atlas by using the metadata and the patch occupancy map, and the metadata may further include information associated with a quantization step applied for generating quantization transform coefficients of a basic view video and the patch video, the texture decoder may dequantize the quantization transform coefficients of the basic view video and the patch video by using the information associated with the quantization step, reconstruct residual samples by inversely transforming the dequantized transform coefficients, and reconstruct the basic view video and the patch video by generating reconstructed samples by means of the residual samples and prediction samples generated by a prediction operation, and the quantization step applied to a transform coefficient of the basic view video and the quantization step applied to a transform coefficient of the patch video may be determined as different values based on a ratio between the basic view video and the patch video.

Figure 10:
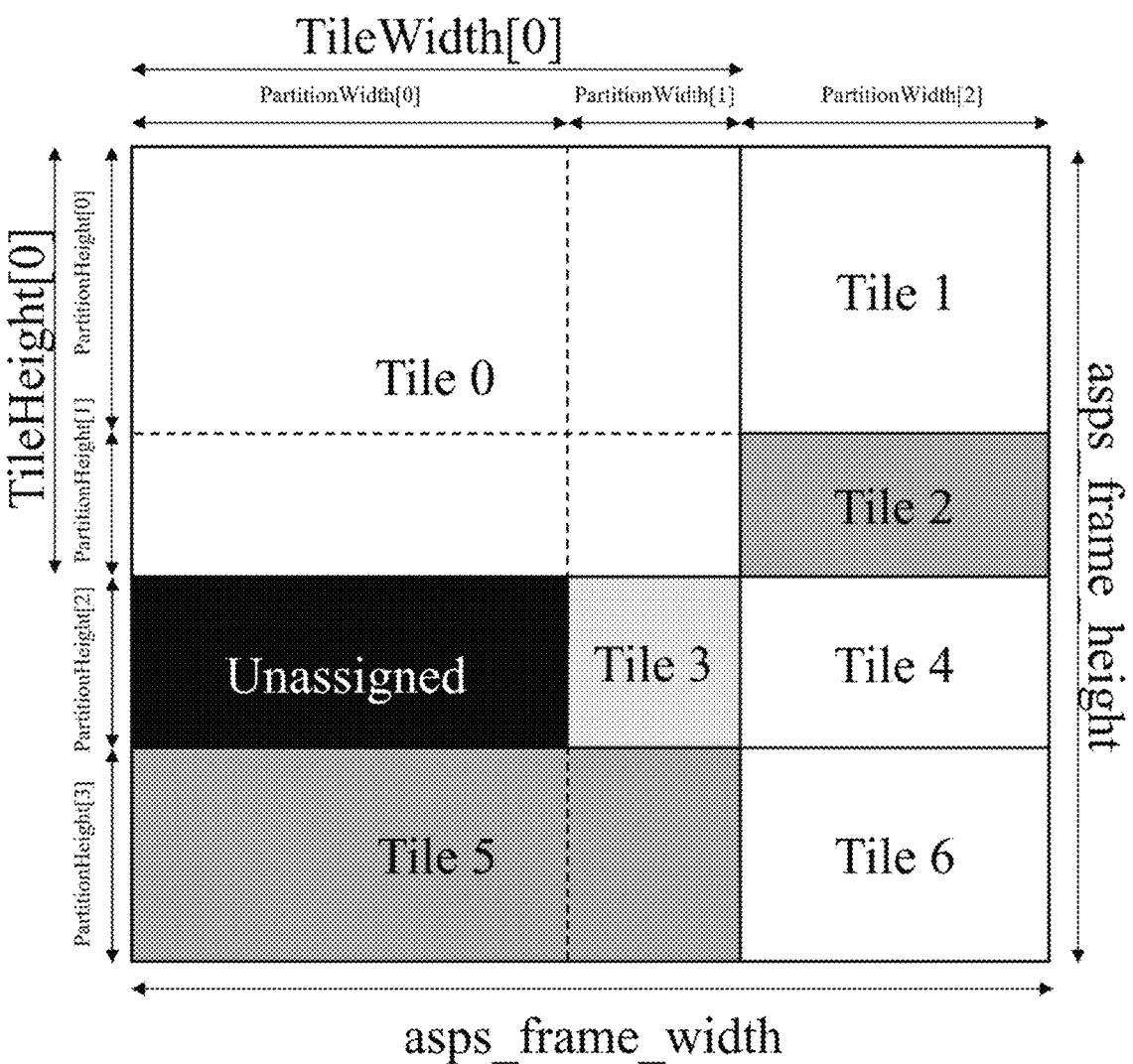
FIG. 10 is a view illustrating an example in which an atlas is divided into one or more visual volumetric video coding (V3C) tiles.

FIG. 10 is a view illustrating examples of visual volumetric video coding (V3C) tiles used in V3C and MIV.

Referring to FIG. 10, an atlas may be divided into one or more V3C tiles, and patch information with redundancy between views being removed may be packed according to each V3C tile. No patch may be inserted into a specific rectangular region. As a V3C tile may correspond to a packing unit, the V3C tile may be referred to as 'packing tile'.

FIG. 11 is a view illustrating an example where an atlas, to which a V3C tile is applied, is encoded by applying a tile or a sub-picture in HEVC or VVC.

A basic view video 1100, which is a criterion for removing redundancy between views, may be packed in a single V3C tile and thus be encoded as a single tile or a single sub-picture. Patches extracted from additional view videos 1110 and 1120 with redundancy between views being removed may be packed in different V3C tiles within an atlas and thus be encoded in different tiles or sub-pictures.

Figure 12:
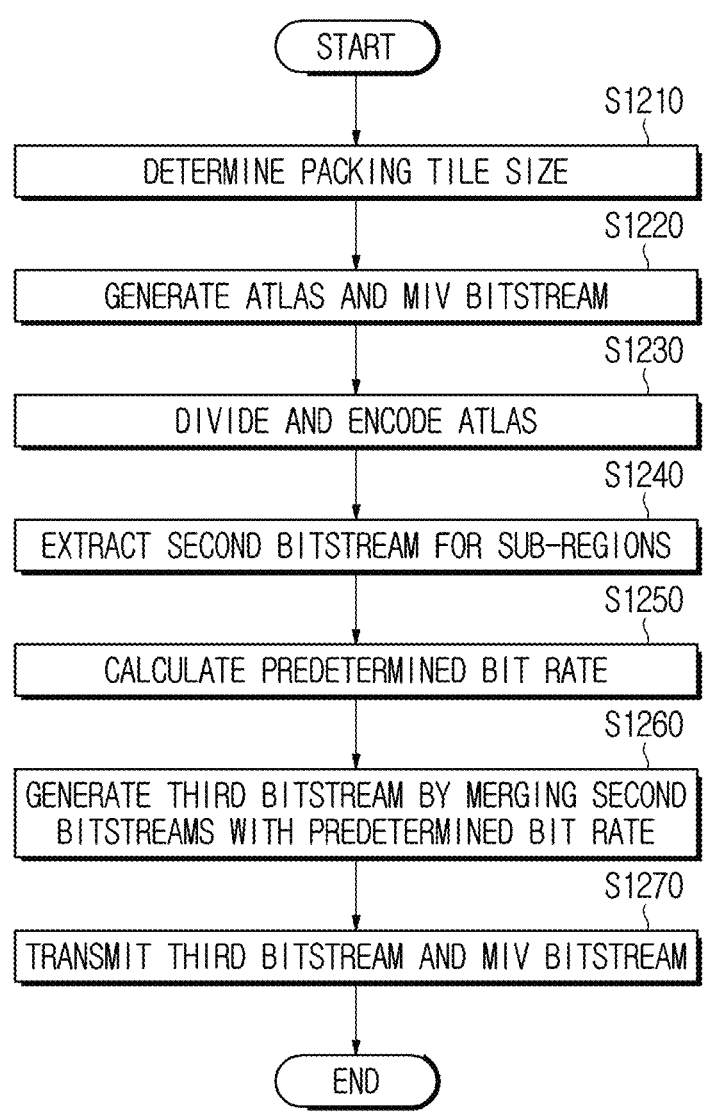
FIG. 12 is a flowchart illustrating a multi-view video encoding method according to one embodiment of the present disclosure.

FIG. 12 is a flowchart illustrating a multi-view video encoding method according to one embodiment of the present disclosure.

Referring to FIG. 12, the multi-view video encoding apparatus 100 may determine a size of a V3C tile (packing tile) (S1210). The number of V3C tiles and a size thereof may be determined in consideration of a size of a basic view video. For example, the size of a V3C tile may be determined to be the same as the size of a basic view video or determined based on the size of a coding tree unit (CTU) in consideration of efficiency in video compression.

The multi-view video encoding apparatus 100 may generate an atlas and an MIV bitstream for a multi-view video (S1220). For example, based on the size of the V3C tile determined at step S1210, patch packing may be performed in a V3C tile unit within an atlas, and the MIV bitstream representing packing metadata may be generated. In this case, a patch occupancy rate within the V3C tile may be recorded. The packing metadata may be referred to as 'information on packing' or 'packing information', and the MIV bitstream, in which the packing metadata (packing information) is encoded, may be referred to as 'fourth bitstream'.

The multi-view video encoding apparatus 100 may divide and encode the atlas (S1230). The atlas may be divided into one or more tiles or one or more sub-pictures, and the tiles or the sub-pictures may correspond to sub-regions of the atlas. In addition, the atlas may be divided into one or more sub-regions based on the size of the V3C tile determined at step S1210. The atlas (or one or more sub-regions) may be encoded in a plurality of different quantization parameters. A first bitstream may be generated through the division and encoding of the atlas.

The multi-view video encoding apparatus 100 may extract a second bitstream for the sub-regions from the first bitstream (S1240). The second bitstream for the sub-regions may correspond to a bitstream one or more tiles or one or more sub-pictures in which the atlas is divided. That is, the second bitstream may be generated by extracting individual tiles or individual sub-pictures corresponding to sub-regions from the first bitstream.

The multi-view video encoding apparatus 100 may calculate a predetermined bit rate (S1250). The predetermined bit rate may be determined based on a patch occupancy rate in a V3C tile. For example, based on the patch occupancy rate in the V3C tile, a bit rate may be calculated according to each tile or sub-picture bitstream (second bitstream) including the V3C tile.

The multi-view video encoding apparatus 100 may generate a third bitstream by merging second bitstreams with the predetermined bit rate among second bitstreams (S1260). That is, the multi-view video encoding apparatus 100 may generate the third bitstream by selecting and merging tile or sub-picture bitstreams satisfying the bit rate calculated at step S1250.

The multi-view video encoding apparatus 100 may transmit the third bitstream and the MIV bitstream (S1270).

Figure 13:
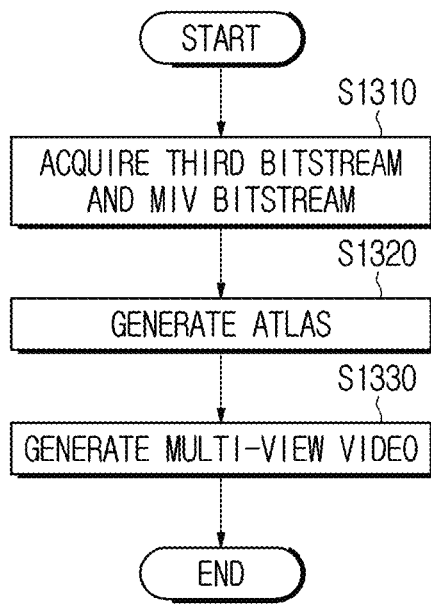
FIG. 13 is a flowchart illustrating a multi-view video decoding method according to one embodiment of the present disclosure.

FIG. 13 is a flowchart illustrating a multi-view video decoding method according to one embodiment of the present disclosure.

Referring to FIG. 13, the multi-view video decoding apparatus 200 may acquire the third bitstream and the MIV bitstream (S1310). The third bitstream may be generated by merging second bitstreams with the predetermined bit rate among second bitstreams, and the MIV bitstream may be generated by encoding the packing metadata (packing information).

The multi-view video decoding apparatus 200 may generate an atlas by decoding the third bitstream (S1320) and generate a video (atlas video) composed of pixels based on the generated atlas.

The multi-view video decoding apparatus 200 may generate a multi-view video using the atlas video and the MIV bitstream (S1330). For example, the multi-view video decoding apparatus 200 may generate a virtual view video responding to a user's view by using the atlas video and the MIV bitstream. The virtual view video thus generated may be expressed through a display.

According to the present disclosure, a transmission bandwidth may be reduced while minimizing quality loss.

In addition, according to the present disclosure, as a quantization step is adaptively selected according to a feature or importance of the video, a high-quality video may be transmitted using a more efficient bandwidth.

In addition, according to the present disclosure, a bitstream with bit rates differentially allocated according to each tile may be constructed using only a small calculation.

In addition, according to the present disclosure, parallel processing is possible when decoding a bitstream composed of one or more tiles or sub-pictures.

It is to be understood that effects to be acquired by the present disclosure are not limited to the aforementioned effects, and other effects not mentioned herein will be apparent to those of ordinary skill in the art to which the present disclosure pertains from the following description.

In the above-described embodiments, methods are described as a series of steps or units based on a flowchart, but the present disclosure is not limited to any sequence of steps, and some steps may occur in a sequence different from what is described above or at the same time as other steps.

In addition, those of ordinary skill in the art will understand that steps in a flowchart are not exclusive from each other and another step can be included or one or more steps of the flowchart can be removed without affecting the scope of the present disclosure.

The above-described embodiments include various aspects of examples. All the possible combinations for expressing such various aspects cannot be described, but those of ordinary skill in the art will know that another combination is possible. Accordingly, the present disclosure may include any other replacements, modifications, and changes within the claims below.

The above-described embodiments of the present disclosure may be implemented in a form of program instructions, which are executable by various computer components, and recorded in a computer-readable recording medium. The computer-readable medium may include program instructions, data file, data structures, and the like either separately or in combinations thereof. Program instructions recorded in the computer-readable medium may be designed and configured specially for the present disclosure or be available as already known to those skilled in the art of computer software. Examples of the computer-readable recording medium include magnetic recording media such as hard disks, floppy disks, and magnetic tapes, optical data storage media such as CD-ROMs or DVD, magneto-optimum media such as floptical disks, and hardware devices such as read-only memory (ROM), random-access memory (RAM), flash memory, etc., which are particularly structured to store and implement the program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

In the above-described embodiments, methods are described as a series of steps or units based on a flowchart, but the present disclosure is not limited to any sequence of steps, and some steps may occur in a sequence different from what is described above or at the same time as other steps. In addition, those of ordinary skill in the art will understand that steps in a flowchart are not exclusive from each other and another step can be included or one or more steps of the flowchart can be removed without affecting the scope of the present disclosure.

The above-described embodiments include various aspects of examples. All the possible combinations for expressing such various aspects cannot be described, but those of ordinary skill in the art will know that another combination is possible. Accordingly, the present disclosure may include any other replacements, modifications, and changes within the claims below.

The above-described embodiments of the present disclosure may be implemented in a form of program instructions, which are executable by various computer components, and recorded in a computer-readable recording medium. The computer-readable medium may include program instructions, data file, data structures, and the like either separately or in combinations thereof. Program instructions recorded in the computer-readable medium may be designed and configured specially for the present disclosure or be available as already known to those skilled in the art of computer software. Examples of the computer-readable recording medium include magnetic recording media such as hard disks, floppy disks, and magnetic tapes, optical data storage media such as CD-ROMs or DVD, magneto-optimum media such as floptical disks, and hardware devices such as read-only memory (ROM), random-access memory (RAM), flash memory, etc., which are particularly structured to store and implement the program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the present disclosure, the present disclosure is not limited to the above embodiments, and those of ordinary skill in the art to which the present disclosure pertains can make various modifications and changes from the above description.

Therefore, the spirit of the present disclosure shall not be limited to the above-described embodiments, and the entire scope of the appended claims and their equivalents will fall within the scope and spirit of the present disclosure.

What is claimed is:

1. A multi-view video encoding method, which is performed in a multi-view video encoding apparatus, the method comprising:

generating first bitstreams for each of a plurality of quantization parameters (QPs) different from each other by encoding an atlas for a multi-view video in the quantization parameters;

extracting second bitstreams for sub-regions in the atlas from the first bitstreams; and generating a third bitstream by merging, among the second bitstreams, second bitstreams with a predetermined bit rate, wherein the atlas is divided based on a size of a packing tile, and wherein the size of the packing tile is determined based on a size of a basic view video of the multi-view video.

2. The method of claim 1, wherein the sub-regions are tiles or sub-pictures.

3. The method of claim 1, wherein the predetermined bit rate is determined based on a patch occupancy rate within the packing tile corresponding to the unit of packing.

4. The method of claim 1, further comprising generating a fourth bitstream by encoding information on packing.

5. A multi-view video decoding method, which is performed in a multi-view video decoding apparatus, the method comprising:

acquiring a third bitstream, in which an atlas for the multi-view video is encoded, and a fourth bitstream in which packing information is encoded;

generating the atlas by decoding the third bitstream; and generating the multi-view video based on the atlas and the packing information, wherein the atlas is divided based on a size of a packing tile, and wherein the size of the packing tile is determined based on a size of a basic view video of the multi-view video.

6. A multi-view video encoding apparatus comprising:

a memory; and at least one processor, wherein the at least one processor is configured to:

generate first bitstreams for each of a plurality of quantization parameters (QPs) different from each other by encoding an atlas divided into at least one sub-region in the quantization parameters, extract second bitstreams for the sub-region from the first bitstreams, and generate a third bitstream by merging, among the second bitstreams, second bitstreams with a predetermined bit rate, wherein the atlas is divided based on a size of a packing tile, and wherein the size of the packing tile is determined based on a size of a basic view video of the multi-view video.

7. A method for transmitting a bitstream generated by a multi-view video encoding method, the method comprising:

generating first bitstreams for each of a plurality of quantization parameters (QPs) different from each other by encoding an atlas divided into at least one sub-region in the quantization parameters;

extracting second bitstreams for the sub-region from the first bitstreams; and generating a third bitstream by merging, among the second bitstreams, second bitstreams with a predetermined bit rate, wherein the atlas is divided based on a size of a packing tile, and wherein the size of the packing tile is determined based on a size of a basic view video of the multi-view video.

* * * * *